United States Patent
Gradtke et al.

(10) Patent No.: US 10,836,658 B2
(45) Date of Patent: Nov. 17, 2020

(54) LIQUID PREPARATION FOR THE REDUCTION OF FREE OXYGEN AND THE PRESERVATION OF WATER

(71) Applicant: L'AIR LIQUIDE, SOCIETE ANONYME POUR L'ETUDE ET L'EXPLOITATION DES PROCEDES GEORGES CLAUDE, Paris (FR)

(72) Inventors: Ralf Gradtke, Tornesch (DE); Wolfgang Beilfuss, Hamburg (DE); Jennifer Knopf, Hamburg (DE); Michael Streek, Hamburg (DE)

(73) Assignee: VINK CHEMICALS GMBH & CO. KG, Kakenstorf (DE)

( * ) Notice: Subject to any disclaimer, the term of this patent is extended or adjusted under 35 U.S.C. 154(b) by 109 days.

(21) Appl. No.: 16/058,787

(22) Filed: Aug. 8, 2018

(65) Prior Publication Data

US 2018/0346357 A1    Dec. 6, 2018

Related U.S. Application Data

(63) Continuation of application No. 14/379,899, filed as application No. PCT/EP2013/051580 on Jan. 28, 2013, now abandoned.

(30) Foreign Application Priority Data

Feb. 28, 2012  (DE) .......... 10 2012 203 003

(51) Int. Cl.
| | | |
|---|---|---|
| C02F 1/58 | (2006.01) | |
| C23F 11/10 | (2006.01) | |
| C02F 101/10 | (2006.01) | |
| C02F 1/70 | (2006.01) | |

(52) U.S. Cl.
CPC .......... *C02F 1/58* (2013.01); *C23F 11/10* (2013.01); *C02F 1/70* (2013.01); *C02F 2101/10* (2013.01); *C02F 2303/08* (2013.01)

(58) Field of Classification Search
None
See application file for complete search history.

(56) References Cited

U.S. PATENT DOCUMENTS

| | | | | |
|---|---|---|---|---|
| 4,626,411 A | * | 12/1986 | Nemes ............ | C02F 1/20 210/750 |
| 5,035,986 A | | 7/1991 | Sakai et al. | |
| 5,254,277 A | * | 10/1993 | Gentit ............. | C10M 133/08 508/508 |
| 7,781,467 B2 | | 8/2010 | Gradtke et al. | |
| 7,935,701 B2 | | 5/2011 | Gradtke et al. | |
| 8,084,480 B2 | | 12/2011 | Gradtke et al. | |
| 8,349,881 B2 | | 1/2013 | Gradtke et al. | |
| 2003/0194656 A1 | * | 10/2003 | Kudo ............. | G03F 7/425 430/314 |
| 2005/0054642 A1 | | 3/2005 | Gradtke et al. | |
| 2006/0223806 A1 | * | 10/2006 | Gradtke ............. | A01N 35/00 514/241 |
| 2008/0027142 A1 | | 1/2008 | Beilfus et al. | |
| 2009/0099188 A1 | | 4/2009 | Gradtke et al. | |
| 2010/0216677 A1 | | 8/2010 | Gradtke et al. | |
| 2011/0180759 A1 | * | 7/2011 | Korosec ............. | C10L 1/14 252/392 |
| 2012/0110899 A1 | | 5/2012 | Beilfus et al. | |
| 2012/0178804 A1 | | 7/2012 | Boettcher | |
| 2012/0309897 A1 | | 12/2012 | Boettcher | |
| 2013/0096167 A1 | | 4/2013 | Gradtke et al. | |
| 2013/0140493 A1 | * | 6/2013 | Mori ............. | C23F 11/08 252/392 |

FOREIGN PATENT DOCUMENTS

| | | | | |
|---|---|---|---|---|
| DE | 24 62 073 | A1 | 11/1975 | |
| DE | 103 40 830 | A1 | 4/2005 | |
| DE | 10 2006 035 013 | A1 | 1/2008 | |
| DE | 10 2009 033 161 | A1 | 1/2011 | |
| EP | 0 161 822 | A2 | 11/1985 | |
| EP | 0 902 017 | A1 | 3/1999 | |
| EP | 1512323 | B1 | 2/2007 | |
| GB | 2 354 771 | A | 4/2001 | |
| WO | 2004/029119 | A1 | 4/2004 | |
| WO | 2004/050733 | A2 | 6/2004 | |
| WO | 2009/060057 | A2 | 5/2009 | |
| WO | 2010/142790 | A1 | 12/2010 | |
| WO | 2011/000794 | A1 | 1/2011 | |
| WO | WO-2012008273 | A1 * | 1/2012 | ............. C23F 11/08 |
| WO | 2012/158425 | A1 | 11/2012 | |
| WO | WO-2012158425 | A1 * | 11/2012 | ............. A01N 47/44 |

OTHER PUBLICATIONS

U.S. Appl. No. 14/379,899, filed Aug. 20, 2014.
International Search Report, dated Apr. 25, 2013, from corresponding PCT application No. PCT/EP2013/051580.
DE Office Action, dated May 27, 2015, DE Application No. 10 2012 203 003.4.

* cited by examiner

*Primary Examiner* — Clare M Perrin
(74) *Attorney, Agent, or Firm* — Nixon & Vanderhye

(57) ABSTRACT

A preparation including a) at least one N-formal and b) at least one dialkylhydroxylamine. The preparation is preferably formulated as a concentrate. The preparation can be used (in particular in the form of the concentrate) for the reduction of free oxygen and the preservation of water, and also correspondingly additivated water. The mixture of N-formals with dialkylhydroxylamine is not only outstandingly compatible, but considerably improves the activity of dialkylhydroxylamines as oxygen scavengers.

16 Claims, No Drawings

LIQUID PREPARATION FOR THE REDUCTION OF FREE OXYGEN AND THE PRESERVATION OF WATER

The invention relates to a liquid preparation for the reduction of free oxygen and the preservation of water. The preparation is preferably formulated as a concentrate. The invention further relates to the use of the preparation (in particular in the form of the concentrate) for the reduction of free oxygen and the preservation of water, and also to correspondingly additivated water.

In the development of gas and oilfields, and also exploitation thereof, in addition to chemical corrosion, microbiological corrosion plays a role which must not be underestimated. In addition, overgrowth with microorganisms is a problem. Slime-forming bacteria can block pipelines. Other microorganisms can initiate corrosion (sulphuric acid production). Sulphate-reducing organisms generate interfering hydrogen sulphide. In addition, biofilms can form which are very difficult to remove again. Whole fields can be infected. Microorganisms can therefore cause enormous economic damage. For suppressing microbiological corrosion, biocides are used, such as quaternary ammonium compounds (quats), glutaraldehyde (GDA), acrolein, isothiazolinones, tetrakis(hydroxymethyl)phosphonium sulphate (THPS) and also dibromonitrilopropionamide (DBNPA), for example.

In chemical corrosion, the oxygen dissolved in water primarily plays an important role. Depending on the temperature and salt content, up to about 10 ppm of $O_2$ dissolve in the water. At an oxygen content of 8 ppm, the corrosion rate is already 25 times higher than in oxygen-free water.

In the installation and repair of pipelines and pressure vessels, it is therefore customary to test the resistance to relatively high pressures in the system with water (what is termed hydrotesting). When this is carried out, generally water which is available on site is taken off, in the case of drilling platforms seawater, in other pipelines also water from rivers and lakes. This water generally has a certain microbial count and a dissolved oxygen fraction of up to about 10 ppm.

Other problems are posed by water which is forced into fields (what is termed injection water) in order then to transport a mixture of water and crude oil to the surface. This water is generally a mixture of fresh water and water which, after the transport and separation from the crude oil, is forced back into the field. This water mixture also contains microorganisms and dissolved oxygen.

Fluids for stabilizing boreholes and pipelines in gas and oil extraction up until onset of regular extraction (what are termed completion fluids), fluids used for the same purpose during interruptions to operation (what are termed workover fluids) and also water-based hydraulic fluids for power transmission must also be adequately protected from corrosion and microbial infection.

The necessity for removal of dissolved oxygen and also preservation of water in the pipelines have long been known in the oil- and gas-extraction industry. The most frequently used oxygen scavengers in these applications are sodium sulphite, ammonium bisulphite and sulphur dioxide. The highly active hydrazine, on account of carcinogenic properties, is used only rarely. To a restricted extent, compounds that are highly active at a relatively high temperature such as carbohydrazide (1,3-diaminourea), hydroquinone, erythorbate, diethylhydroxylamine (DEHA) and also methyl ethyl ketone oxime (butoxime) are used.

Many of the abovementioned biocides, however, are not compatible with the oxygen scavengers used in hydrotesting. Manufacturers therefore recommend that the oxygen scavengers are not used together with other chemicals, since the activity can be completely lost.

A great number of biocides such as, e.g., glutaraldehyde, acrolein, isothiazolinones, DBNPA etc., in addition, cannot be formulated as stable, storable, alkaline concentrate, since the biocides are not stable in an alkaline environment.

The water must therefore be first freed from dissolved oxygen in the alkaline pH range and then preserved. This separation of the operations for removing the dissolved oxygen and the subsequent elimination of microorganisms is time-consuming and costly, and separating the degassed water is not always possible without problems. Since the dissolved oxygen must be removed first and the oxygen scavenger is used in excess, in addition the amount of biocide used must be such that the excess of oxygen scavenger can react to completion and a still sufficiently active amount of biocide is present.

The use of N-formals and diethylhydroxylamine is known from other applications.

WO 2011/000794 A1 and WO 2010/142790 A1 relate to coatings which are stabilized with aziridine compounds that are adsorbed onto carrier materials. As further, optional components, formaldehyde-releasing compounds such as bisoxazolidines and hydroxylamines such as diethylhydroxylamine are described.

WO 2004/050733 A2 discloses phenol resins. Curing agents which are described are oxazolidines and hydroxylamines.

GB 2 354 771 A discloses bactericidal combinations in detergents. In an extensive list of active bactericidal compounds (BPD list), inter alia, diethylhydroxylamine and 3,3'-methylene bis-5-methyloxazolidine are listed.

US 2011/0180759 A1 describes methods and compositions for the reduction of stress corrosion cracking in steel transport and storage vessels containing bioethanol. The compositions contain a combination of oxygen scavengers and film-forming additive. One example of an oxygen scavenger is diethylhydroxylamine. One example of a film-forming additive is diisopropanolamine.

WO 2004/029119 A1 describes a method for curing phenol-formaldehyde resins. Suitable additives are formaldehyde slow-release compounds such as oxazolidines. Optional polymerization inhibitors which are suitable are, for example, N-propylhydroxylamine and diethylhydroxylamine.

EP 0 902 017 A1 describes a method for transesterification of polymerizable monomers. One alcohol suitable for the transesterification is hydroxyethyl-oxazolidine. One example of a polymerization inhibitor is diethylhydroxylamine.

The object of the present invention is to provide preparations for the reduction of free oxygen in water (in particular for hydrotesting and as injection water) and the preservation of this water.

The preparations should be stable and easy to meter even as concentrates.

It has now surprisingly been found that these and other objects are achieved by a liquid preparation which comprises
a) at least one N-formal and
b) at least one dialkylhydroxylamine of the formula RR'NOH, wherein R and R' independently are selected from linear, branched and cyclic $C_1$ to $C_{10}$ alkyl groups.

The liquid preparation is used for the simultaneous reduction of free oxygen and preservation of water, in particular salt water. Furthermore—for a constant biocidal activity— the activity of the oxygen scavenger is markedly increased without further additions before use.

The invention is based, inter alia, on the fact that it has been found that mixing N-formals with dialkylhydroxylamines is not only outstandingly compatible, but the activity of dialkylhydroxylamines is considerably improved by the formaldehyde-releasers. The activity of dialkylhydroxylamines is also markedly increased by the pH elevation. This synergistic activity is evident not only in mains water but also in a 3% solution of sodium chloride in mains water.

DETAILED DESCRIPTION OF THE INVENTION a) N-Formal

Preparations according to the invention contain at least one N-formal. The advantages of these microbicidal active ingredients are disclosed, inter alia, in DE 103 40 830 A1 and DE 10 2009 033 161 A1. Particularly suitable N-formals are reaction products of formaldehyde and amines (preferably alkanolamines) having a molar formaldehyde excess. Preference is given to low-water formaldehyde slow-release compounds which react in an alkaline manner in water.

Examples of N-formals are condensation products of paraformaldehyde and isopropanolamine in the molar ratio 3:2, condensation products of paraformaldehyde and isopropanolamine in the molar ratio 3:2 and urea and condensation products of paraformaldehyde and isopropanolamine in the molar ratio 3:2, and also urea and ethylene glycol.

N-Formals which are preferably used according to the invention are N,N'-methylenebis(5-methyloxazolidine), α,α',α"-trimethyl-1,3,5-triazine-1,3,5-(2H,4H,6H)-triethanol, 4,4-dimethyloxazolidine, dimethylolurea, 5-ethyl-3,7-dioxa-1-azabicyclo[3.3.0]octane, 2-(hydroxymethylamino) ethanol, methylenebistetrahydro-1,3-bisoxazine, N-methylolchloroacetamide, bis(hydroxymethyl)-5,5-dimethylhydantoin, diazolidinylurea, sodium hydroxymethylglycinate, 3,4,4-trimethyloxazolidine, 2,2',2"-(hexahydro-1,3,5-triazine-1,3,5-triyl)triethanol and tetrahydro-1,3,4,6-tetrakis(hydroxymethyl)imidazo[4,5-d]imidazole-2,5-(1H,3H)dione.

Particular preference as formaldehyde slow-release compound is given to 3,3'-methylenebis(5-methyloxazolidine), 2,2',2"-(hexahydro-1,3,5-triazine-1,3,5-triyl)-triethanol, α,α',α"-trimethyl-1,3,5-triazine-1,3,5-(2H, 4H, 6H)triethanol, tetrahydro-1,3,4,6-tetrakis-(hydroxymethyl)imidazo[4,5-d]imidazole-2,5-(1H,3H)-dione, dimethylol urea and also the products Grotan® OF (methylenebis(5-methyloxazolidine)+urea) and Grotan® OK (methylenebis(5-methyloxazolidine)+urea+ethylene glycol).

Very particular preference as formaldehyde slow-release compound is given to 3,3'-methylenebis(5-methyloxazolidine).

b) Dialkylhydroxylamine

Preparations according to the invention contain at least one dialkylhydroxylamine of the formula RR'NOH, wherein R and R' independently of one another are selected from linear, branched and cyclic $C_1$-$C_{10}$ alkyl groups. Examples of R and R' are independently of one another methyl, ethyl, propyl, butyl, pentyl, hexyl, octyl and decyl. Particular preference as component b) is given to diethylhydroxylamine (DEHA).

In compositions preferred according to the invention, the weight ratio of component a) to component b) is typically 30:1 to 1:5, preferably 25:1 to 1:1, in particular 20:1 to 3:1, for instance 9:1.

c) Antioxidant

The preparation according to the invention further preferably contains c) at least one antioxidant. Preferred antioxidants are, at room temperature, liquid or sufficiently soluble in the formaldehyde slow-release compound. Examples of antioxidants are selected from sterically hindered phenols, amines, vitamin E and derivatives thereof, and alkyl esters of gallic acid, preferably 3-tert-butyl-4-hydroxyanisole (BHA), 2,6-di-tert-butyl-p-cresol (BHT), 2,6-di-tert-butylphenol, lauryl gallate and vitamin E.

In particular, preference is given to 2,6-di-tert-butylphenol and BHT as antioxidants.

d) Alkalizing Agents

The preparation according to the invention in addition contains preferably d) at least one alkalizing agent which has the effect that, in the ready-to-use dilution (additivated water), a sufficiently alkaline pH is maintained, which is particularly advantageous for the short-time activity of the oxygen scavenger. Examples of alkalizing agents are amines or alkanolamines such as isopropanolamine, propanolamine, monoethanolamine, diethanolamine, triethanolamine, aminomethylpropanol and aminobutanol.

The alkalizing agent, as mentioned, increases the activity of the oxygen scavenger and should be able to elevate the pH of the additivated water at the ready-to-use concentration. Suitable alkalizing agents are all substances which are stable in the mixture according to the invention of the components a) and b) and are readily soluble in water.

Alternative alkalizing agents are inorganic compounds such as alkali metal hydroxides or alkali metal salts such as KOH, NaOH, Na carbonate, potassium or sodium waterglass, amines or alkanolamines such as ethanolamine, isopropanolamine, fatty amines, medium-chain amines or alkanolamines such as diisopropanolamine, hydroxylamine and ammonium hydroxide. Preferred alkalizing agents are ethanolamine, isopropanolamine, NaOH, KOH, waterglass, hydroxylamine and ammonium hydroxide.

In addition, preferred preparations further contain e) at least one of stabilizers, activators, corrosion inhibitors, scale inhibitors, complexing agents, fungicides, algicides, antifoams, cold stabilizers, solvents and boosters.

Examples of further functional additives, which can be combined with preparations according to the invention, are:
  stabilizers such as urea, glycols such as ethylene glycol, propylene glycol;
  catalysts, e.g. redox catalysts such as salts of Cu, Co, Mn, Ni and Fe, hydroquinone (in particular at a low usage temperature, the use of a catalyst can be advantageous);
  solvents such as alcohols, glycols, glycol ethers, hydrocarbons, fuels and
  known alternative oxygen scavengers such as tartronic acid or tartronic derivatives or salts, sulphite salts, hydrazine, dihydroxyacetone, carbohydrazide, hydroquinone, erythorbate, methyl ethyl ketone oxime and also gallates.

In addition, further antimicrobial active ingredients can also be present. Examples of further antimicrobial active ingredients which can be present in the compositions according to the invention are aldehydes such as GDA, formaldehyde slow-release compounds such as ethylene glycol bishemiformal, THPS, organohalogen compounds such as DBNPA, quats such as benzalkonium chloride, amines such as Lonzabac 12, phenols, iso-thiazolones such as MI, CMI, OIT, DCOIT, BIT, n-Bu-BIT and Bunte salts.

The preparations according to the invention can be combined with further biocidal active ingredients, functional additives and auxiliaries, as are disclosed, eg. in WO2009/060057 A2, DE 10 2006 035013 A1, or DE 103 40 830 A1.

As explained hereinafter, preparations according to the invention are typically formulated as liquid concentrates.

Liquid Concentrate

In the preparations according to the invention which are formulated as a liquid concentrate, the fraction of component a) is preferably at least 30% by weight, more preferably at least 35% by weight, in particular at least 40% by weight, such as at least 45% by weight, for example about 50% by weight. The fraction of component b) is typically at least 0.25% by weight, preferably at least 1% by weight, in particular at least 2% by weight, for instance 5% by weight. Particular preference is given to liquid concentrates which consist of the components a), b) and optionally c) and/or d), that is to say, in addition, contain no further components.

Preferably, the concentrate contains 0.0001 to 10% by weight, more preferably 0.001 to 1% by weight, particularly preferably 0.002 to 0.1% by weight, for instance 0.02% by weight, of antioxidant c).

Liquid concentrates contain, when alkalizing agent d) is present, preferably at least 20% by weight, more preferably at least 30% by weight, in particular at least 40% by weight, such as at least 45% by weight of component d), for example about 50% by weight of component d).

The concentrates according to the invention preferably contain at most 30% by weight of water, more preferably at most 20% by weight of water, particularly preferably at most 12% by weight of water, in particular at most 5% by weight of water, such as, for example, less than 1.0% by weight of water.

A particularly preferred liquid concentrate consists of:
a) about 45% by weight of 3,3'-methylenebis(5-methyloxazolidine),
b) about 5% by weight of DEHA and
d) about 50% by weight of alkalizing agent.

The liquid concentrate is prepared by charging component a) (for example 3,3'-methylenebis(5-methyloxazolidine)) and then dissolving component b), for example DEHA, with stirring.

Liquid concentrates according to the invention are used prophylactically in concentrations of 100 to 2000 mg/l (ppm), preferably 200 to 1000 ppm, based on the total amount of active ingredient a) and b) and also optionally c) and d), without solvent or diluent.

The invention further relates to the use of the preparation according to the invention for the reduction of free oxygen in water with simultaneous preservation of the water. The water can be a fluid for stabilizing boreholes and pipelines in the extraction of gas and oil up until uptake of regular extraction (what is termed completion fluid), fluid used for the same purpose during interruption to operations (what is termed workover fluid) and also a water-based hydraulic fluid for power transmission.

Other applications of the preparations according to the invention (in particular concentrates) are the reduction of free oxygen and preservation of process water, aqueous systems, industrial water, seawater, salt water, drilling fluids, hot water, injection water, wastewaters (such as industrial wastewaters, wastewaters from agriculture, from the extraction of crude oil or natural gas), transport and storage fluids (for example minerals, coal, fuels), heating water, aqueous and/or alkaline cleaning solutions, recycling water, water and condensate water which are deaerated and optionally charged with inert gas.

The components a), b) and optionally c) and/or d)—and also, when present, e)—are used according to the invention in the water in an amount which effectively reduces free oxygen and preserves the water.

The combination of the components a), b) and optionally c) is used in water preferably by adding a fluid concentrate. Alternatively, it is possible to add the components a), b) and optionally c) singly, but this alternative is not preferred.

In addition, the invention relates to an additivated water which comprises the components a) and b) (and also optionally c) and/or d)—and, when present e)).

The liquid preparations according to the invention (in particular liquid concentrates) offer the following advantages in this case:
multifunctional activity with synergistic increase in activity,
provision of a stable liquid concentrate,
replacement of a 2-stage or multistage method by a single-stage method,
combination of biocidal activity, oxygen scavenger activity, corrosion protection, stabilizer function and alkalizing agent,
improvement of the oxygen scavenger activity of DEHA by addition of N-formal,
very good compatibility of the components,
cold-stable, liquid, low-water, water-miscible,
good thermal stability,
good stability as concentrate and in the ready-to-use dilution, and
good stability at relatively high process temperature, high salt content and relatively high pressure.

The advantages of the invention appear, in particular, from the examples hereinafter. Unless stated otherwise, all percentages relate to the weight.

Examples

Composition of selected N-formals that are used in the examples.

N-Formal BK:
Reaction product of ethanolamine and formaldehyde (91%) in the molar ratio 3:3. This forms N,N',N''-tris(2-hydroxyethyl)hexahydrotriazine. Reaction water and water from the formaldehyde remain in the product.

N-Formal WS:
Reaction product of isopropanolamine and formaldehyde (91%) in the molar ratio 3:3. This forms N,N',N''-tris-(2-hydroxypropyl)hexahydrotriazine. Reaction water and water from the formaldehyde remain in the product.

N-Formal OX:
Reaction product of isopropanolamine and formaldehyde (91%) in the molar ratio 2:3. This forms 3,3'-methylenebis(5-methyloxazolidine). The reaction water and water from the formaldehyde are distilled off.

N-Formal OF:
Reaction product of isopropanolamine and formaldehyde (91%) in the molar ratio 2:3. This forms 3,3'-methylenebis(5-methyloxazolidine). The reaction water and water from the formaldehyde are distilled off. Addition of urea for reduction of the free formaldehyde (mixture contains about 4% urea).

N-Formal OK:
Reaction product of isopropanolamine and formaldehyde (91%) in the molar ratio 2:3. This forms 3,3'-methylenebis(5-methyloxazolidine). The reaction water and water from the formaldehyde are distilled off. Addition of urea and ethylene glycol for reduction of the free formaldehyde and for reducing the amine odour (mixture contains about 4.6% urea and about 9.5% ethylene glycol).

GDA:

Glutardialdehyde (obtainable as up to 50% strength solution in water) is currently one of the most used biocides in these applications.

Formal TK 5:

Contains as biocide a reaction product of ethylene glycol and paraformaldehyde (91%) in the molar ratio 1:2. As a stabilizing component, urea is further present. The reaction water and the water from the paraformaldehyde remain in the product.

In the examples hereinafter, the oxygen reduction in water was studied.

Apparatus Name:

Multi 3320 Set B with the optical oxygen sensor FDO 925 from WTW.

Procedure:

For experiments 1 to 4, in each case fresh mains water (Norderstedt municipal water) is taken off from the tap in an amount such that the water quality is identical for each experiment of a series of experiments. After addition of the described substances, the mixture is stirred until the solution became clear. In each case ~100 ml are made up.

Into this solution the oxygen sensor is immersed and stirred until the indicated oxygen content remains constant (approximately 1-2 minutes). After the measurement the sample is allowed to stand and the measurement repeated after 3 hours.

Experiment 1 (temperature approximately 26° C.):

| No. | Sample | Oxygen, mg/l (immediately) | Oxygen, mg/l (after 3 h) |
|---|---|---|---|
| A | Mains water | 6.42 | 7.16 |
| B | Mains water + 50 ppm DEHA | 1.48 | 0.81 |
| C | Mains water + 500 ppm mixture of N-formal OX/DEHA (10% DEHA in N-formal OX) | 0.13 | 0.21 |
| D | Mains water + 500 ppm N-formal OX | 7.45 | 7.75 |
| E | 3% sodium chloride in mains water (LW) | 7.10 | 7.55 |
| F | 3% NaCl in LW + 50 ppm DEHA | 6.80 | 4.88 |
| G | 3% NaCl in LW + 500 ppm mixture of N-formal OX/DEHA (10% DEHA in N-formal OX) | 0.42 | 0.27 |
| H | 3% strength NaCl in LW + 500 ppm N-formal OX | 8.12 | 8.21 |
| I | 3% strength sodium chloride solution + 81 ppm butanoxime | 7.32 | 7.52 |
| J | 3% strength sodium chloride solution + 500 ppm mixture of N-formal OX/butanoxime (16.2% butanoxime in N-formal OX) | 7.37 | 7.59 |

As the table on experiment 1 shows, mains water contains 6.4 mg/l of oxygen. After the sample is allowed to stand for 3 h at room temperature, some oxygen dissolves again and a content of 7.2 mg/l of $O_2$ is indicated (A).

After addition of 50 ppm of diethylhydroxylamine, the oxygen content is reduced to 1.5 mg/l (after standing for 3 h, 0.8 mg/l). The mixture under C contains 50 ppm of diethylhydroxylamine and 450 ppm of N-formal OX. The oxygen reduction proceeded more rapidly and the remaining oxygen is less than according to experiment B. The comparison with experiment D with 500 ppm N-formal OX in mains water shows that the formal alone has no effect on the oxygen content.

The results of experiments E to H show the same experiments in mains water which contains 3% sodium chloride in order to show that the mixture of N-formal with 10% diethylhydroxylamine also functions with seawater. The experiments E to H even show a still greater effect of the mixture on the oxygen reduction than under A to D.

The experiment under I and J shows that butanoxime does not function. The oxygen scavenger butanoxime was tested because a stable mixture with N-formal OX can also be formulated thereby. It results therefrom that not all known oxygen scavengers demonstrate the surprising effect on combination with N-formal as is achieved according to the present invention.

Experiment 2 (temperature approximately 26° C.):

| No. | Sample | Oxygen, mg/l (immediately) | Oxygen, mg/l (after 3 h) |
|---|---|---|---|
| 1 | Mains water (LW) | 6.55 | 7.20 |
| 2 | LW + 50 ppm DEHA | 1.51 | 1.64 |
| 3 | LW + 500 ppm N-formal WS | 7.08 | 7.31 |
| 4 | LW + 500 ppm N-formal OX | 6.88 | 7.19 |
| 5 | LW + 500 ppm GDA (50%) | 6.95 | 7.23 |
| 6 | LW + 500 ppm formal TK 5 | 7.09 | 7.25 |
| 7 | LW + 500 ppm mixture of N-formal WS/DEHA (10% DEHA in N-formal WS) | 0.21 | 0.46 |
| 8 | LW + 500 ppm mixture of N-formal OX/DEHA (10% DEHA in N-formal OX) | 0.45 | 1.11 |
| 9 | LW + 500 ppm mixture of GDA (50%)/DEHA (10% DEHA In GDA (50%)) | 2.22 | 1.44 |
| 10 | LW + 500 ppm mixture of formal TK 5/DEHA (10% DEHA in N-formal TK 5) | 3.05 | 1.04 |
| 11 | 3% sodium chloride in mains water (LW) | 7.95 | 8.01 |
| 12 | 3% NaCl in LW + 50 ppm DEHA | 7.70 | 4.16 |
| 13 | 3% NaCl in LW + 500 ppm N-formal WS | 8.08 | 8.18 |
| 14 | 3% NaCl in LW + 500 ppm N-formal OX | 8.20 | 8.25 |
| 15 | 3% NaCl in LW + 500 ppm GDA (50%) | 8.19 | 8.14 |
| 16 | 3% NaCl in LW + 500 ppm formal TK 5 | 8.46 | 8.39 |
| 17 | 3% NaCl in LW + 500 ppm mixture of N-formal WS/DEHA (10% DEHA in N-formal WS) | 3.82 | 5.53 |
| 18 | 3% NaCl in LW + 500 ppm mixture of N-formal OX/DEHA (10% DEHA in N-formal OX) | 0.55 | 0.54 |
| 19 | 3% NaCl in LW + 500 ppm mixture of GDA (50%)/DEHA (10% DEHA in GDA (50%)) | 8.12 | 4.56 |
| 20 | 3% NaCl in LW + 500 ppm mixture of N-formal TK 5/DEHA (10% DEHA in formal TK 5) | 8.06 | 4.94 |

The table for experiment 2 shows the activity of the oxygen reduction of the mixtures of various formaldehyde slow-release compounds with diethylhydroxylamine (DEHA). Experiments 1-10 are carried out in mains water, and experiments 11-20 in mains water that contains 3% sodium chloride. The activity of DEHA showed the best results in combination with N-formal OX and N-formal WS.

Experiment 3 (temperature approximately 26° C.:

| No. | Sample | Oxygen mg/l (immediately) | Oxygen mg/l (after 3 h) | pH |
|---|---|---|---|---|
| 1 | 3% sodium chloride in mains water (LW) + 300 ppm isopropanolamine | 7.79 | 8.07 | 10.03 |

Experiment 3 shows the oxygen reduction with addition of an alkalizing agent (isopropanolamine). Here also, the activity of the mixture of N-formal OX is somewhat better than diethylhydroxylamine (DEHA) alone or with other formals or glutaraldehyde (GDA). As can also be seen in experiment 5, the combination of glutaraldehyde with DEHA cannot be formulated in a stable manner as concentrate with isopropanolamine.

Procedure:

Fresh municipal water (allowed to run for a short time) from one takeoff. The presolutions with 3% sodium chloride in mains water and 3% sodium chloride with 300 ppm of isopropanolamine in mains water are cooled down to approximately 4° C. using an icebath.

Experiment 3 (temperature approximately 26° C.):

| No. | Sample | Oxygen mg/l (immediately) | Oxygen mg/l (after 3 h) | pH |
|---|---|---|---|---|
| 2 | 3% NaCl in LW + 300 ppm isopropanolamine + 50 ppm DEHA | 0.30 | 1.13 | 10.04 |
| 3 | 3% NaCl in LW + 300 ppm isopropanolamine + 500 ppm mixture of N-formal WS/DEHA (10% DEHA in N-formal WS) | 0.43 | 1.31 | 10.16 |
| 4 | 3% NaCl in LW + 300 ppm isopropanolamine + 500 ppm mixture of N-formal OX/DEHA (10% DEHA in N-formal OX) | 0.24 | 0.9 | 10.07 |
| 5 | 3% NaCl in LW + 300 ppm isopropanolamine + 500 ppm mixture of GDA (50%)/DEHA (10% DEHA in GDA (50%)) | 0.41 | 1.62 | 9.72 |
| 6 | 3% NaCl in LW + 300 ppm isopropanolamine + 500 ppm mixture of formal TK 5/DEHA (10% DEHA in N-formal TK 5) | 0.72 | 1.8 | 9.8 |

Experiment 4 (temperature approximately 4° C.):

| No. | Sample | Oxygen mg/l (immediately) | approx. 13° C. Oxygen mg/l (after 3 h) | pH |
|---|---|---|---|---|
| 1 | 3% sodium chloride in mains water (LW) | 4.33 | 7.4 | 8.25 |
| 2 | 3% NaCl in LW + 50 ppm DEHA | 5.85 | 5.32 | 8.24 |
| 3 | 3% NaCl in LW + 500 ppm mixture of N-formal WS/DEHA (10% DEHA in N-formal WS) | 5.03 | 0.89 | 9.16 |
| 4 | 3% NaCl in LW + 500 ppm mixture of N-formal OX/DEHA (10% DEHA in N-formal OX) | 3.45 | 0.29 | 9.3 |
| 5 | 3% NaCl in LW + 500 ppm mixture of GDA (50%)/DEHA (10% DEHA in GDA (50%)) | 5.95 | 4.88 | 7.77 |
| 6 | 3% NaCl in LW + 500 ppm mixture of formal TK 5/DEHA (10% DEHA in formal TK 5) | 5.69 | 5.63 | 7.98 |
| 7 | 3% sodium chloride in mains water (LW) + 300 ppm isopropanolamine | 6.79 | 6.88 | 9.25 |
| 8 | 3% NaCl in LW + 300 ppm isopropanolamine + 50 ppm DEHA | 4.04 | 0.8 | 9.42 |
| 9 | 3% NaCl in LW + 300 ppm isopropanolamine + 500 ppm mixture of N-formal WS/DEHA (10% DEHA in N-formal WS) | 4.32 | 0.67 | 9.61 |
| 10 | 3% NaCl in LW + 300 ppm isopropanolamine + 500 ppm mixture of N-formal OX/DEHA (10% DEHA in N-formal OX) | 4.9 | 0.66 | 9.52 |
| 11 | 3% NaCl in LW + 300 ppm isopropanolamine + 500 ppm mixture of GDA (50%)/DEHA (10% DEHA in GDA (50%)) | 3.71 | 0.47 | 9.22 |
| 12 | 3% NaCl in LW + 300 ppm isopropanolamine + 500 ppm mixture of formal TK 5/DEHA (10% DEHA informal TK 5) | 5.05 | 2.49 | 9.22 |

In experiment 4 also, which was carried out at +4° C., in order to simulate real experimental conditions in the extraction of oil in relatively cold waters, the good results with mixtures of N-formals with diethylhydroxylamine are confirmed.

Experiment 5, Stability of concentrates

| Raw material | A w % | B w % | C w % | D w % | E w % | F w % |
|---|---|---|---|---|---|---|
| N-Formal OX | 90.0 | 60.1 | | | | |
| N-Formal WS | | | 90.0 | 60.1 | | |
| Glutaraldehyde 50% | | | | | 90.0 | 60.1 |
| Diethylhydroxylamine | 10.0 | 6.7 | 10.0 | 6.7 | 10.0 | 6.7 |
| Monoisopropanolamine | — | 33.2 | — | 33.2 | — | 33.2 |
| | 100.0 | 100.0 | 100.0 | 100.0 | 100.0 | 100.0 |

| Zero point | A | B | C | D | E | F |
|---|---|---|---|---|---|---|
| Appearance | clear, colourless | clear, colourless | clear, light yellow | clear, light yellow | stir after one night, clear yellow solution | the addition of MIPA leads to a reaction, mixture becomes a dark broth; discarded! |
| pH (0.05% in LW) | 9.6 | 9.7 | 9.5 | 9.7 | 9.5 | |
| Colour index H/G | 20/0.0 | 14/0.0 | 47/0.4 | 33/0.1 | 102/0.4 | |
| Density (g/ml) | 1.0400 | 1.0188 | 1.0660 | 1.0324 | 1.1045 | |
| Refraction 20° C. | 1.4697 | 1.4655 | 1.4683 | 1.4631 | 1.4246 | |
| Diethylhydroxylamine % | 10.3 | 6.78 | 10.4 | 5.36 | 9.87 | |
| Eliminatable HCHO % | 40.9 | 26.4 | 24.3 | 16.0 | | |
| Glutaraldehyde % | | | | | 44.3 | |

| | A | B | C | D | E |
|---|---|---|---|---|---|
| 2 months' storage at 25° C. | | | | | |
| Appearance | clear, light yellow | clear, yellow (viscous) | clear, deep yellow | clear, yellowish-brown | clear, deep yellow |
| Colour index H/G | 108/0.3 | 193/1.2 | 376/2.5 | 739/4.3 | 848/4.4 |
| DEHA % | 9.84 | 6.08 | 9.97 | 4.99 | 9.99 |
| HCHO % | 40.5 | 26.5 | 23.8 | 14.9 | |
| GDA % | | | | | 25.6 |
| 2 months' storage at 40° C. | | | | | |
| Appearance | clear, yellow | clear, yellow (viscous) | clear, orange-brown | clear, orange-brown | dark red solution |
| Colour index H/G | 162/0.8 | 611/3.9 | 835/4.7 | ***/5.9 | ***/10.8 |
| Density (g/ml) | 1.0431 | 1.0552 | 1.0683 | 1.0335 | 1.1157 |
| Refraction 20° C. | 1.4715 | 1.4866 | 1.4695 | 1.4636 | 1.4358 |
| DEHA % | 9.86 | 6.07 | 9.91 | 5.08 | 9.07 |
| HCHO % | 39.9 | 25.8 | 22.8 | 15.3 | |
| GDA % | | | | | 15.4 |

Experiment 5 shows the good stability of N-formals towards glutaraldehyde (both without and also with isopropanolamine). The concentrate of GDA and DEHA is not stable after addition of isopropanolamine. Without isopropanolamine, even after 2 months' storage at 25° C., almost half of the glutaraldehyde used, and at 40° C., ⅔ of the glutaraldehyde used, are no longer present.

The invention claimed is:

1. A liquid preparation comprising:
   at least 30% by weight of at least one N-formal selected from the group consisting of N,N'-methylenebis(5-methyloxazolidine), α,α',α''-trimethyl-1,3,5-triazine-1,3,5-(2H,4H,6H)triethanol, 4,4-dimethyloxazolidine, dimethylolurea, 5-ethyl-3,7-dioxa-1-azabicyclo[3.3.0]octane, 2-(hydroxymethylamino) ethanol, methylenebistetrahydro-1,3-bisoxazine, N-methylolchloroacetamide, bis(hydroxymethyl)-5,5-dimethylhydantoin, diazolidinylurea, sodium hydroxymethylglycinate, 3,4,4-trimethyloxazolidine, 2,2',2''-(hexahydro-1,3,5-triazine-1,3,5-triyl)triethanol and tetrahydro-1,3,4,6-tetrakis(hydroxymethyl)imidazo[4,5-d]imidazole-2,5-(1H,3H)dione;
   diethylhydroxylamine;
   at least 20% by weight of at least one alkalizing agent; and
   at most 20% by weight of water, wherein the at least one N-formal and diethylhydroxylamine are present in a weight ratio of the at least one N-formal to diethylhydroxylamine of 20:1 to 3:1.

2. The preparation according to claim 1, further comprising at least one antioxidant selected from the group consisting of sterically hindered phenols, amines, vitamin E and derivatives thereof, alkyl esters of gallic acid, 2,6-di-tert-butyl-p-cresol (BHT), 2,6-di-tert-butylphenol, lauryl gallate, and vitamin E.

3. The preparation according to claim 2, wherein the at least one antioxidant is the combination of 2,6-di-tert-butylphenol and BHT.

4. The preparation according to claim 1, further comprising at least one component selected from the group consisting of stabilizers, activators, corrosion inhibitors, scale inhibitors, complexing agents, fungicides, algicides, antifoams, cold stabilizers, solvents, and boosters.

5. The preparation according to claim 1, wherein the preparation is a concentrate and the at least one N-formal is at least 35% by weight of the preparation.

6. The preparation according to claim 5, wherein the at least one alkalizing agent is at least 30% by weight of the preparation.

7. The preparation according to claim 5, wherein water in the concentrate is at most 12% by weight of the preparation.

8. The preparation according to claim 5, wherein the at least one alkalizing agent is at least 40% by weight of the preparation.

9. The preparation according to claim 5, wherein water in the concentrate is at most 5% by weight of the preparation.

10. The preparation according to claim 1, wherein the preparation is a concentrate and dietheylhydroxylamine is at least 2% by weight of the preparation.

11. The preparation according to claim 1 wherein the weight ratio of the at least one N-formal to diethylhydroxylamine is 9:1.

12. The preparation according to claim 1, wherein the preparation is a concentrate and the at least one N-formal is at least 40% by weight of the preparation.

13. The preparation according to claim 1, wherein the preparation is a concentrate and dietheylhydroxylamine is 5% by weight of the preparation.

14. A method for the reduction of free oxygen in water and preservation of water comprising adding the liquid preparation of claim 1 to water.

15. The method according to claim 14, wherein the liquid preparation is a concentrate, and the concentrate is added to the water in an amount of 100 to 2000 ppm.

16. A liquid preparation comprising:
at least 40% by weight of at least one N-formal selected from the group consisting of N,N'-methylenebis(5-methyloxazolidine), α,α',α"-trimethyl-1,3,5-triazine-1,3,5-(2H,4H,6H)triethanol, 4,4-dimethyloxazolidine, dimethylolurea, 5-ethyl-3,7-dioxa-1-azabicyclo[3.3.0]octane, 2-(hydroxymethylamino) ethanol, methylenebistetrahydro-1,3-bisoxazine, N-methylolchloroacetamide, bis(hydroxymethyl)-5,5-dimethylhydantoin, diazolidinylurea, sodium hydroxymethylglycinate, 3,4,4-trimethyloxazolidine, 2,2',2"-(hexahydro-1,3,5-triazine-1,3,5-triyl)triethanol and tetrahydro-1,3,4,6-tetrakis(hydroxymethyl)imidazo[4,5-d]imidazole-2,5-(1H,3H)dione;
at least 2% by weight of diethylhydroxylamine;
at least 40% by weight of at least one alkalizing agent; and
at most 5% by weight of water;
wherein the at least one N-formal and diethylhydroxylamine are present in a weight ratio of the at least one N-formal to diethylhydroxylamine of 20:1 to 3:1.

* * * * *